(12) United States Patent
Felstaine et al.

(10) Patent No.: US 10,291,543 B1
(45) Date of Patent: May 14, 2019

(54) SYSTEM, METHOD, AND COMPUTER PROGRAM FOR DEFRAGMENTING A NETWORK BASED ON NETWORK FUNCTION VIRTUALIZATION (NFV)

(71) Applicant: Amdocs Development Limited, Limassol (CY)

(72) Inventors: Eyal Felstaine, Hertzeliya (IL); Ofer Hermoni, Yavne (IL); Itzik Kitroser, Beer Sheva (IL); Nimrod Sandlerman, Ramat Gan (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 414 days.

(21) Appl. No.: 15/007,076

(22) Filed: Jan. 26, 2016

Related U.S. Application Data

(60) Provisional application No. 62/107,943, filed on Jan. 26, 2015.

(51) Int. Cl.
*G06F 15/173* (2006.01)
*H04L 12/923* (2013.01)

(52) U.S. Cl.
CPC ................................. *H04L 47/762* (2013.01)

(58) Field of Classification Search
CPC ................................................... H04L 47/762
See application file for complete search history.

(56) References Cited

U.S. PATENT DOCUMENTS

| | | | | |
|---|---|---|---|---|
| 8,825,964 B1* | 9/2014 | Sopka | ................ | G06F 3/0671 711/152 |
| 2009/0276771 A1* | 11/2009 | Nickolov | ............ | G06F 9/4856 717/177 |
| 2011/0010514 A1* | 1/2011 | Benhase | ................ | G06F 3/061 711/162 |
| 2012/0324445 A1* | 12/2012 | Dow | ................ | G06F 9/45504 718/1 |

* cited by examiner

*Primary Examiner* — Suraj M Joshi
*Assistant Examiner* — Jaren Means
(74) *Attorney, Agent, or Firm* — Zilka-Kotab, P.C.

(57) ABSTRACT

A system, method, and computer program product are provided for migrating availability of a resource type in a communication network using network function virtualization, comprising: selecting a resource type; selecting a first section of the network where demand for the resource type is expected to grow; selecting a second section of the network where demand for the resource type is expected to be stable relative to the first section; selecting a third section of the network communicatively coupled to the first and second sections, the third section comprising higher availability of the resource type than the first section; migrating a first virtual network function (VNF) instance from the third section to the first section; and migrating a second virtual network function instance from the second section to the third section.

17 Claims, 11 Drawing Sheets

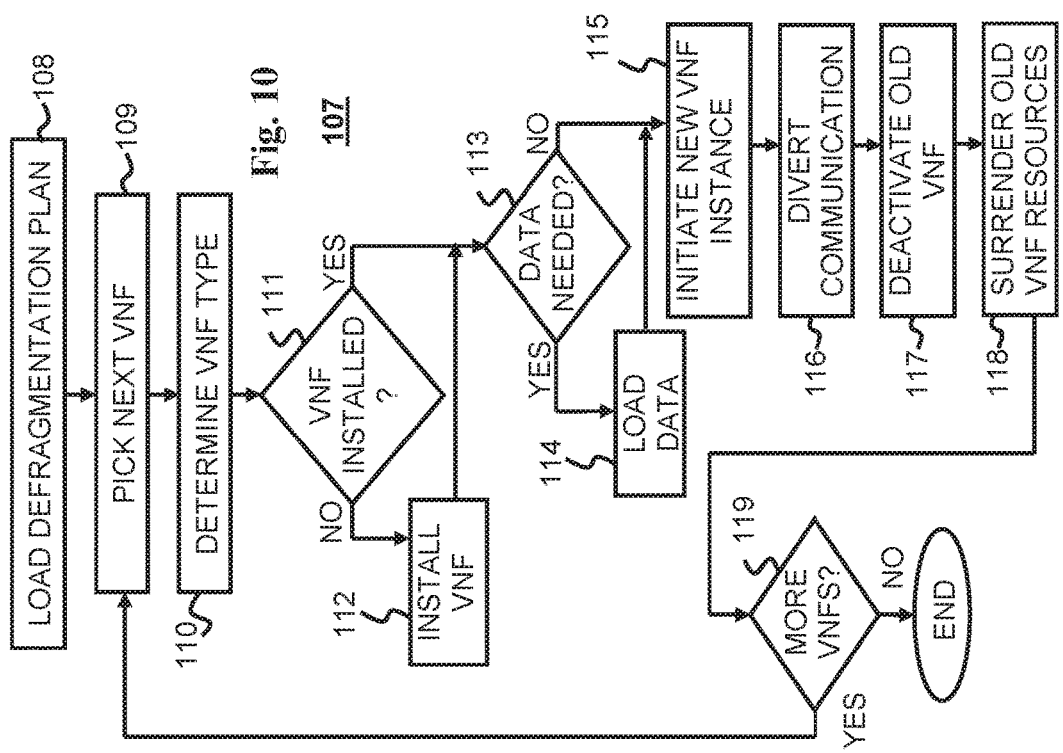
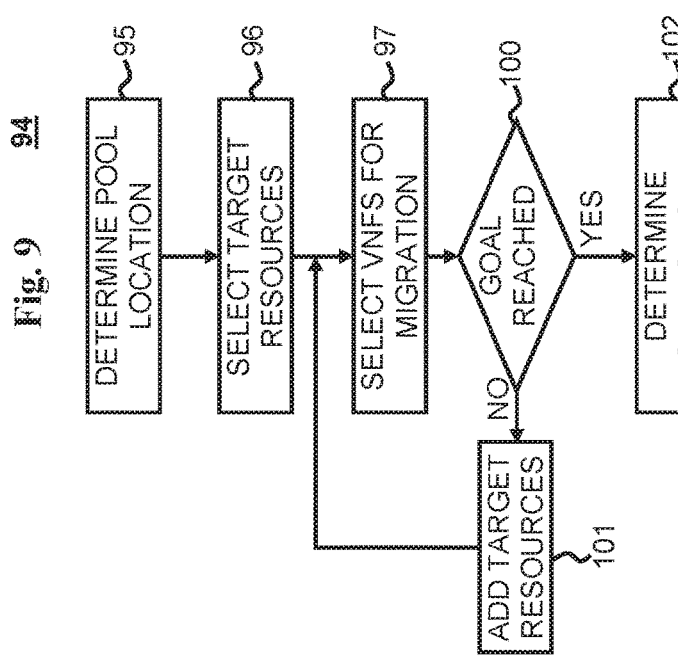

SYSTEM, METHOD, AND COMPUTER PROGRAM FOR DEFRAGMENTING A NETWORK BASED ON NETWORK FUNCTION VIRTUALIZATION (NFV)

CLAIM OF PRIORITY

This application claims the benefit of U.S. Provisional Application No. 62/107,943, filed Jan. 26, 2015, the entire contents of which are incorporated herein by reference.

FIELD OF THE INVENTION

The present invention relates to telecommunications (telecom) and/or data communications and, more particularly, but not exclusively to network function virtualization (NFV) of telecom networks, and, more particularly, but not exclusively to defragmenting resource allocation in an NFV-based network.

BACKGROUND

Network Function Virtualization is a term or a name of a proposed architecture of telecom services as published by the European Telecommunications Standards Institute (ETSI) in a series of documents available from the ETSI website. The purpose of NFV is separate the software from the hardware. NFV uses a generic hardware platform and software adapted for the generic hardware platform. Thus, NFV creates a network much more flexible and dynamic than a legacy communication network. In NFV-based networks, a service is based on one or more virtual network functions or features (VNF) that can be executed on any generic hardware processing facility. Therefore, VNFs are installed, removed, and moved between hardware facilities, much more easily, less costly and thus, more frequently.

The NFV-based network is managed by a software program including an NFV orchestration (NFV-O) component. Typically, the NFV-O is responsible for installing, activating, and deactivating VNFs and VNF instances, as well as other functions of the NFV-based network. If two NFV-based networks should be connected, their respective NFV-Os should coordinate their functionality and activities. An NFV-O therefore manages in a typical processing unit a plurality of VNFs of various services provided by different VNF vendors.

Therefore, the NFV-O is typically responsible for optimizing the deployment of VNFs and VNF instances within the NFV-based network and the allocation of network resources to the various VNFs and VNF instances, so that the services rendered by the NFV-based network to its customers meet the requirements such as Service Level Agreement (SLA), Quality of Service (QoS), etc. The NFV-O optimizes the VNF deployment resource allocation repeatedly for maximal utilization of the available infrastructure. This repetitive optimization fragments the network, which then limits the ability of the NFV-O to optimize the VNF deployment resource allocation in run-time. There is thus a need for addressing these and/or other issues associated with the prior art.

SUMMARY

A system, method, and computer program product are provided for migrating availability of a resource type in a communication network using network function virtualization, comprising: selecting a resource type; selecting a first section of the network where demand for the resource type is expected to grow; selecting a second section of the network where demand for the resource type is expected to be stable relative to the first section; selecting a third section of the network communicatively coupled to the first and second sections, the third section comprising higher availability of the resource type than the first section; migrating a first virtual network function (VNF) instance from the third section to the first section; and migrating a second virtual network function instance from the second section to the third section.

Unless otherwise defined, all technical and scientific terms used herein have the same meaning as commonly understood by one of ordinary skill in the art to which this invention belongs. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

BRIEF DESCRIPTION OF THE DRAWINGS

Embodiments of the invention are herein described, by way of example only, with reference to the accompanying drawings. With specific reference now to the drawings in detail, it is stressed that the particulars shown are by way of example and for purposes of illustrative discussion of several embodiments of the present invention only, and are presented in order to provide what is believed to be a useful and readily understood description of the principles and conceptual aspects of the invention. In this regard, no attempt is made to show structural details of the invention in more detail than is necessary for an understanding of the invention, the description taken with the drawings making apparent to those skilled in the art how the several forms of the invention may be embodied in practice.

In the drawings:

FIG. 9 is a simplified flow chart of a defragmentation planning process, in accordance with one embodiment:

FIG. 10 is a simplified flow chart of a defragmentation executing module, in accordance with one embodiment;

DETAILED DESCRIPTION

Figure 1:
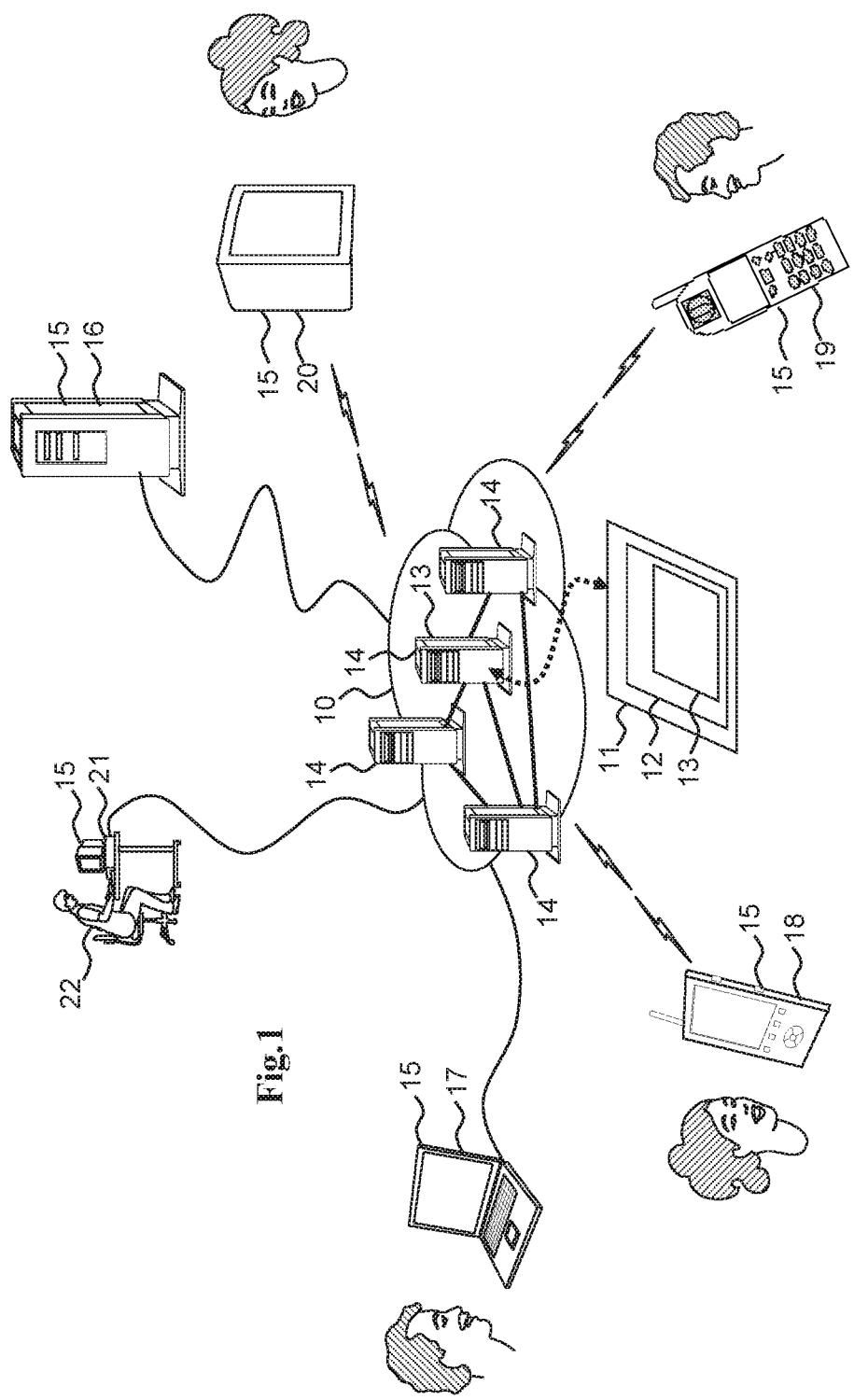
FIG. 1 is a simplified illustration of an NFV-based communication network including a chain optimization module, in accordance with one embodiment.

The present embodiments comprise a system, method, and computer program product for defragmenting VNF deployment and/or resource allocation in a communication network using network function virtualization.

The terms "network" and "communication network" refer to the hardware and software connecting one or more communication terminals including wireline networks, wireless networks, and combinations thereof.

The terms "network function virtualization" (NFV) and virtual network function (NFV) are described in a series of documents published by the European Telecommunications Standards Institute (ETSI) and available from the ETSI website. The term "virtual network function or feature (VNF) refers to a particular implementation of a function, a feature, or a service provided by the network, internally within the network, or externally to a customer, subscriber, end-user, a terminal or a server. The term VNF refers to the software program implementation of the function or feature or service. The term VNF instance (VNF-I) refers to a particular process or task executing the VNF program by a particular processor or computing facility and/or used by a particular customer (or subscriber, end-user, terminal or server).

The term "service" refers to any type of use (such as a use case) that a NFV-based communication network may offer or provide to one or more communication terminals. A service may include switching data or content between any number of terminals, providing content from a server to a terminal or between servers, securing and protecting communication and content, processing content provided by the customer or by a third party, providing backup and redundancy, etc. A service typically includes one or more VNFs and/or one or more VNF instances forming a service sub-network. In this document the term "chain" typically refers to such service sub-network, such a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of a plurality of VNF instances making a particular service. The terms chain optimization and service optimization may thus be used interchangeably.

The term "session" refers to a communication connection between two or more entities that persists for a period of time during which data may be exchanged there between. A session is typically implemented and managed by a session layer in the corresponding network protocol. The term session may include a network session and a logical session. The network session is typically associated with the devices used to communicate, while the logical session is associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" applies that the session or the service is not interrupted, or that an interruption is short enough that a user is not aware of such interruption, or that the interruption does not cause any loss of data.

The term "availability" or "service availability" refers to a level of the service, or a characteristic of the service, in which the service provider should provide the service albeit possible hardware or software faults. For example, the service provider may obligate the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a network fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply to, but is not limited to, hardware, software, data and/or content.

The principles and operation of a system, method, and computer program product for coordinating the operation and/or orchestration of two or more NFV-based networks according to embodiments of the present invention may be better understood with reference to the following drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different figures may use different scales and different scales can be used even within the same drawing, for example different scales for different views of the same object or different scales for the two adjacent objects.

Reference is now made to FIG. 1, which is a simplified illustration of an NFV-based communication network 10 including an NFV management system 11, an NFV-orchestration (NFV-O) module 12, and a defragmentation module 13, according to one embodiment of the present invention.

As seen in FIG. 1, at least one NFV-based network 10 is provided. In the context of the present network architecture, the NFV-based network 10 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 10 may be provided.

NFV-based network 10 typically includes one or more computation facilities 14, each including one or more hardware units and interconnected by communication links to form the NFV-based network 10. At least one of the computation facilities 14 includes NFV management system 11. NFV management system 11 typically includes NFV-O module 12 and defragmentation module 13.

Defragmentation module 13 is typically a part or a component of NFV-O module 12. However, defragmentation module 13, NFV-O module 12 and NFV management system 11 may be separate software programs provided by different vendors. NFV-based network 10 may even have a plurality of any of NFV management systems 11, NFV-O modules 12 and/or defragmentation modules 13.

Coupled to NFV-based network 10 is a plurality of devices 15. For example, a server computer 16 and a computer or terminal 17 may be coupled to the network NFV-based network 10 for communication purposes. Such end-user computer or terminal 17 may include a desktop computer, a lap-top computer, and/or any other type of logic or data processing device. Still yet, various other devices may be coupled to the network NFV-based network 10 including a personal digital assistant (PDA) device 18, a mobile phone device 19, a (cable, aerial, mobile, satellite) television 20, etc. Typically these devices 15 are owned and/or operated by end-users, subscribers and/or customers of NFV-based network 10. Other devices 15, such as administration station 21, is typically owned and/or operated by the operator of the NFV-based network 10.

Network administrator 22 typically supervises at least some aspects of the operation of the NFV-based network 10 by controlling an NFV infrastructure including NFV management system 11. NFV-O 12, and defragmentation module 13.

Figure 2:
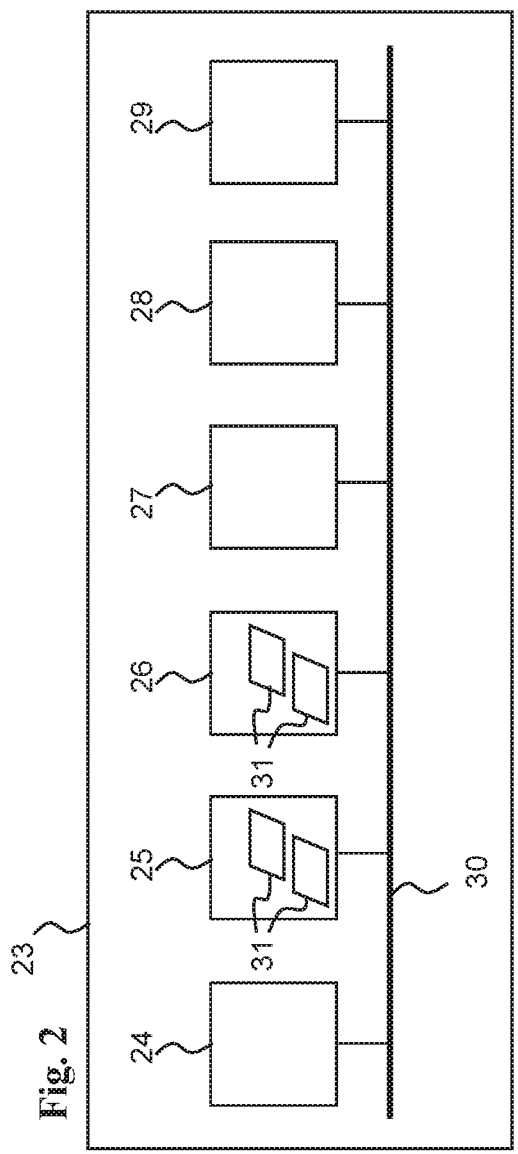
FIG. 2 is a simplified block diagram of a hardware unit of an NFV-based network, in accordance with one embodiment.

Reference is now made to FIG. 2, which is a simplified block diagram of a hardware unit 23 of an NFV-based network 10 according to one embodiment of the present invention.

Hardware unit 23 is typically a computing facility 14 of FIG. 1 or a part of computing facility 14. Hardware unit 23 is typically a computing machine. The term computing machine relates to any type or combination of computing devices, or computing-related units, including, but not limited to, a processing device, a memory device, a storage device, and/or a communication device. Hardware unit 23 can therefore be a network server, and computing facility 14 can be a plurality of network servers, or a data-center, including cloud-based infrastructure. As an option, the hardware unit 23 may be implemented in the context of any of the devices of the NFV-based network 10 of FIG. 1 and/or FIG. 4 and in any desired communication environment.

Each hardware unit 23 (or computing machine, computing device, computing-related unit, and/or hardware component), including each communication link between such hardware units, is typically associated with one or more performance type and a respective performance rating or value, where the hardware unit and/or communication link is operative to provide the performance value. Performance types are, for example, processing power, cash memory capacity, regular memory capacity (RAM, dynamic, or volatile memory), non-volatile memory (such as flash memory) capacity, storage capacity, power, cooling, bandwidth, bitrate, latency, jitter, bit error rate, packet loss, etc.

Hardware unit 23 is operative to provide computing infrastructure and resources for any type and/or instance of software component executed within the NFV-based network 10. In this regard, hardware unit 23 is operative to process any of the processes described here, including but not limited to, any NFV-related software component and/or process. In this respect hardware unit 23 is operative to process virtual network functions (VNFs), VNF instances, network function virtualization orchestration (NFV-O) software, modules and functions, data center management software, cloud management systems (CMS), etc.

As seen in FIG. 2, the hardware unit 23, in accordance with one embodiment includes the following components: at least one processor unit 24; one or more memory units 25, e.g., random access memory (RAM), a non-volatile memory such as a Flash memory, etc.; one or more storage units 26 including, for example, a hard disk drive and/or a removable storage drive, representing a floppy disk drive, a magnetic tape drive, a compact disk drive, etc. [the removable storage drive reads from and/or writes to a removable storage unit in a well-known manner]; one or more communication units 27; one or more graphic processors 28 and displays 29; one or more communication buses 30 connecting the above units; one or more computer programs 31, or computer control logic algorithms, which may be stored in any of the memory units 25 and/or storage units 26. Such computer programs, when executed, enable hardware unit 23 to perform various functions (to be set forth below, for example). Memory units 25 and/or storage units 26 and/or any other storage are possible examples of tangible computer-readable media.

It is appreciated that computer program 31 may include any of NFV management system 11. NFV-O 12, and defragmentation module 13.

Figure 3:
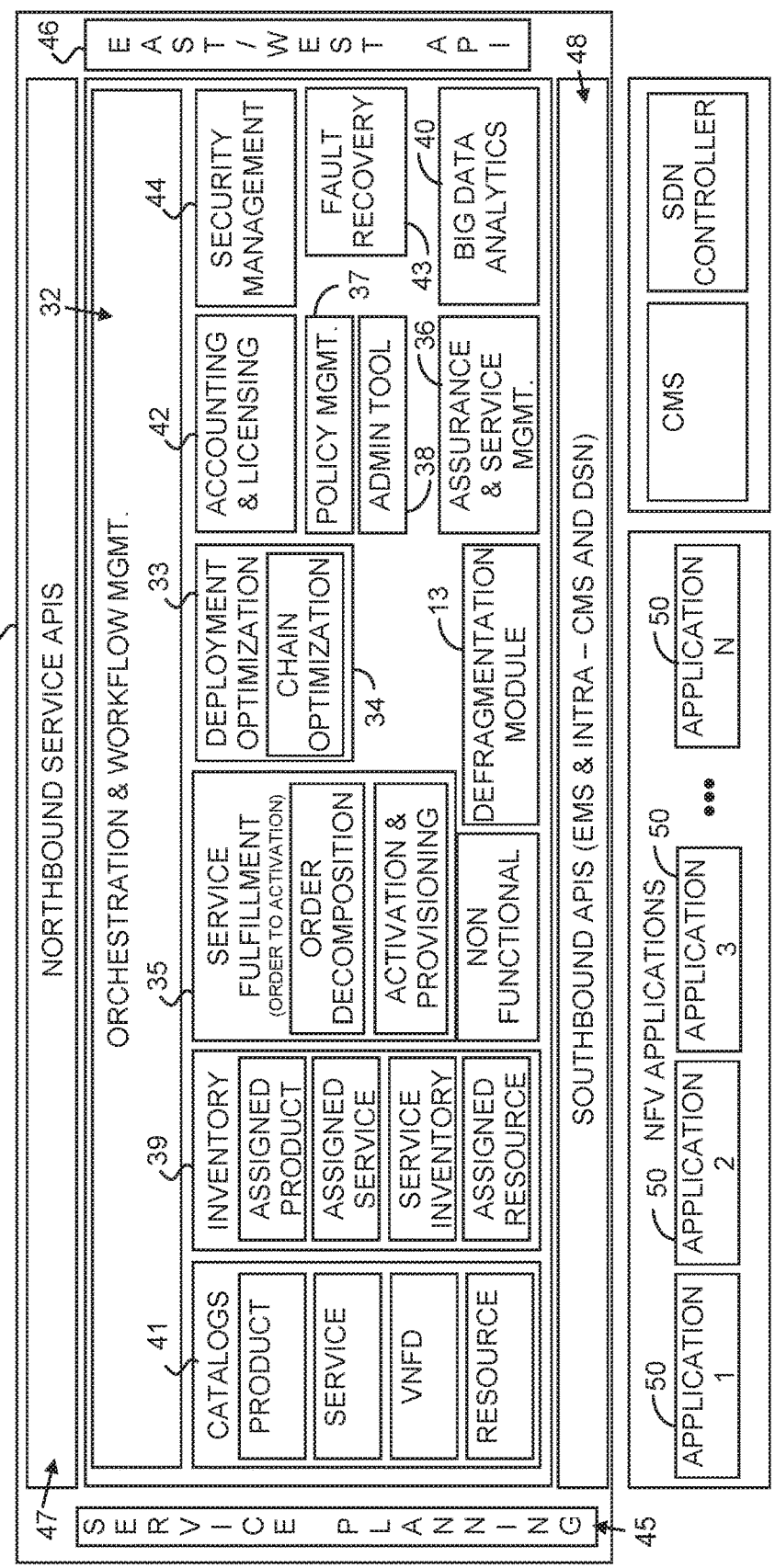
FIG. 3 is a simplified block diagram of NFV-infrastructure including network function virtualization orchestration layer (NFV-O), including a chain optimization module, in accordance with one embodiment.

Reference is now made to FIG. 3, which is a simplified block diagram of a detailed NFV management system 11, including NFV-O module 12, and defragmentation module 13, according to one embodiment of the present invention.

As seen in FIG. 3, NFV management system 11 typically includes one or more NFV-O modules 12, each including the parts described below.

Orchestration and workflow management 32 is responsible for managing (orchestrate) and executing all NFV-O processes, including inbound and/or outbound communication and interfaces.

Deployment optimization module 33 enables a user to devise automatic mechanisms for network optimizations. The deployment optimization module 33 may operate these mechanisms automatically and continuously to optimize the distribution of VNFs 50 and their VNF instances 51 in real-time (or near-real-time) by migrating VNFs 50 and VNF instances 51 between hardware units 23.

Chain optimization module 34 is typically a part of deployment optimization module 33 and enables a user to devise automatic mechanisms for optimizing the deployment of chains or groups of VNFs 50 and VNF instances 51. A service provided by NFV-based network 10 is typically made of a particular chain or group of particular VNFs 50 and their respective VNF instances 51. Chain optimization module 34 optimizes the deployment of chains or groups or services between hardware units 23 according to the requirements and specifications associated with and/or adapted to the particular service, or chain, or a group.

Chain optimization module 34 may operate these mechanisms automatically and continuously to optimize in real-time the operation of chains or groups of VNFs 50 and their VNF instances 51 by re-planning their distribution among hardware units 23 and optionally also by migrating VNFs 50 and VNF instances 51 between hardware units 23.

Service fulfillment module 35 manages service and resource (VNF) instance lifecycle activities as part of the process and orchestration activities. This includes on boarding, initiation (instantiation), installation and configuration, scaling, termination, software update (of running VNFs), test environment, and rollback procedure. Additionally, this module may also provide decomposition of an order to multiple network services, and the activation of such network service as a single VNF instance 51, or as a chain of VNF instances 51.

Order decomposition includes translating business orders into network oriented service implementation plan. For example, a business order may be decomposed into a plurality of functions, some of which may be provided by different software programs or modules (such as various VNFs 50) instantiated as a plurality of VNF instances 51 across one or more data centers. Performing order decomposition, service fulfillment module 35 typically consults deployment optimization module 33 for the best deployment option to customer order in a given network and resource condition. Performing order decomposition, service fulfillment module 35 then initiates the service including all its components. Order decomposition is performed in several locations across the NFV-O hierarchy, i.e., initial decomposition is performed in the root of the NFV-O, and then further decomposition is performed in the relevant data centers.

Activation and Provisioning provides the plan for activation and provisioning of the service to the orchestration and workflow management. It also provides feedback on fulfillment status to upper layer. This upper layer is typically the business support services (BSS).

Assurance and Service Management module 36 gathers real time data on network elements status and creates a consolidated view of services and network health. The module also triggers events associated with lifecycle management and faults. This module monitors the health of the network and executes fault recovery activities. The assurance module provides the ability to monitor services' status and performance according to the required criteria. The assurance module interacts with the network infrastructure (including computing, storage and networking) to receive the required information, analyses it and acts upon each incident according to the defined policy. The assurance is able to interact with analytics to enrich the policy assurance module. Interfaces are also provided for implementation by an external system.

Policy management module 37 enables a user to define and configure offline and/or real-time policy for controlling VNF and service related rules. The module contains the preconfigured policies and activities as well as selection rules for the NFV-O process to determine the preferred policy or activity to be performed for a particular process event. The policy management is multi-layered, including vendor policy, service policy, operator policy, etc. The policy mechanism triggers the suitable policy layer (vendor/service/operator).

Administration module 38 provides an overall view of the network, manual lifecycle management and intervention, and manual system administration and configuration. The module enables a user such as administrator 22 to manage, view, and operate the NFV-O system. The module also provides a view of the network topology and services, the ability to perform specific activities such as manual lifecycle management, and changing service and connectivity configuration.

Inventory management module 39 maintains a distributed view of deployed services and HW resources. Inventory catalogues reflect the current instantiation and allocation of the resources and services within the network mapped into products and/or customer entities.

Big data analytics module 40 analyzes network and service data to support network decisions involving services and subscribers to improve network performance based on actual usage patterns. The module also generates what-if scenarios to support business-oriented planning processes. Additionally, the module analyses and evaluates the information for various planning aspects (Virtual Network Capacity Planning, Data Center Capacity Planning, Value based planning, Cost analysis for network deployment alternatives, etc.) deployment and management (Guided Operator Recommendations, What-if scenario analysis and simulation, application rapid elasticity and resource usage optimization etc.), and supports business-oriented planning processes.

A catalog module 41 include records defining various aspects of the network, such as products, services, and resources such as hardware units and VNFs (VNF directory). The catalog module 41 is typically a collection of centralized, hierarchical information repositories containing resource, service and product definitions with their relationship, versioning, descriptors, etc. Such records typically include templates enabling a user such as administrator 22 to define particular network components such as resources, products, services, etc. A resource template defines resources descriptors, attributes, activities, procedures, connectivity, etc. A service template defines a service variation from resource building blocks. A product template defines parameters of a sellable product (prices, rating, etc.) based on service composition (this may be part of BSS catalogue).

Inventory management module 39, big data analytics module 40, and/or catalog module 41 may support multiple data centers, multiple CMSs and provide centralized view across the infrastructure. Inventory management module 39, big data analytics module 40, and/or catalog module 41 may also support hybrid networks and services maintaining both physical and virtual resources.

Accounting and licensing module 42 records and manages network software usage data for commercial purposes including licensing, accounting, billing, and reconciliation of services with subscribers and providers. The module manages licensing and usage of virtual network application, ability to support complex rating schemes, based on various parameters such as CPU, memory, data, etc. The module enables users to define the pricing of particular VNF modules and provide settlement with vendors. The module also enables the evaluation of internal costs of services provided within the network for calculating ROI.

Fault recovery module 43 (otherwise named disaster recovery planning module or DRP) enables a user to plan and manage disaster recovery procedures for the NFV-O and the entire network.

Security management module 44 provides the authentication authorization and accounting services of application security across the network.

The authentication module and function (including identity management) authenticates the identity of each user defined in the system. Each user has a unique user identity and password. The system supports password based authentication with flexible password policy. Integration with external authentication providers can be done via additional system enhancements.

The authorization module and function supports a role-based access control (RBAC) mechanism, where each user is assigned with one or more roles according to the business needs based on the least privileges concept (for example, standard or administrator roles).

Accounting module and function provides audit of security events such as authentication or login events.

The security module use rules to protect sensitive information, for example: that the data accessed is used for the specific purposes for which it was collected; that sensitive information is encrypted when in storage and transit, and masked/truncated on display and logs, and that the entire security system is deployed in the customer's intranet network (behind network/infrastructure measures), in an independent domain.

Secure Development Life Cycle (SDLC) ensures that security aspects are handled during the project's life cycle, such as security design, security testing, etc.

Service planning module 45 is typically used by CSP sales representative, enterprise, and/or technician, as part of selling engagement process with enterprise/SMB customers.

The module provides the ability to interact with catalogues, customer data, network and ordering system to provide online network service proposal for the enterprise customers with ability to quote update the proposal, validate the serviceability and network inventory and once done provide the service order for activation using the northbound interface.

Service planning module 45 is also used to define/build new services, both internal (core) services and services that are sold to the customer (consumer or business). The definition of the service includes the elements that comprise the service, such as VNFs and VNF instances, and the connectivity between the different elements. In case of a customer service, a new product will be offered in the product catalog.

Defragmentation module 13 is typically part of an NFV-O module 12 providing recovery of resource fragmentation typically caused by repetitive processes of deployment optimization, including chain optimization. Details of the defragmentation process executed by defragmentation module 13 are provided below.

East/west APIs 46 includes the following main domains/activities interfaces: information source to big data repository; interacting with the physical network system (OSS); and hybrid network management supporting services that are composed of virtual and physical elements, such as a security service composed of virtual firewall and physical DDoS box. In case of hybrid service, the NFV-O decomposes the entire order, executes the virtual part of the order, and forwards the physical part of the order to OSS to fulfil (and report) the order.

Northbound APIs 47 provides an application programming interface (API) to the following external software packages: Business support system (BSS) for service order fulfillment, cancel and update activities, status notification, resource inventory view, etc., monitoring system, assurance system, service planning tool, administration tool for system view and configuration, and big data repository.

Southbound APIs 48 provides APIs for the following external software packages: CMS—service and VNFs lifecycle activities—receiving from the infrastructure status and monitoring information for upstream system and activities (e.g., assurance); SDN Controller (or other connectivity system) to configure inter and intra data center connectivity; and EMS to configure the VNF.

Figure 4:
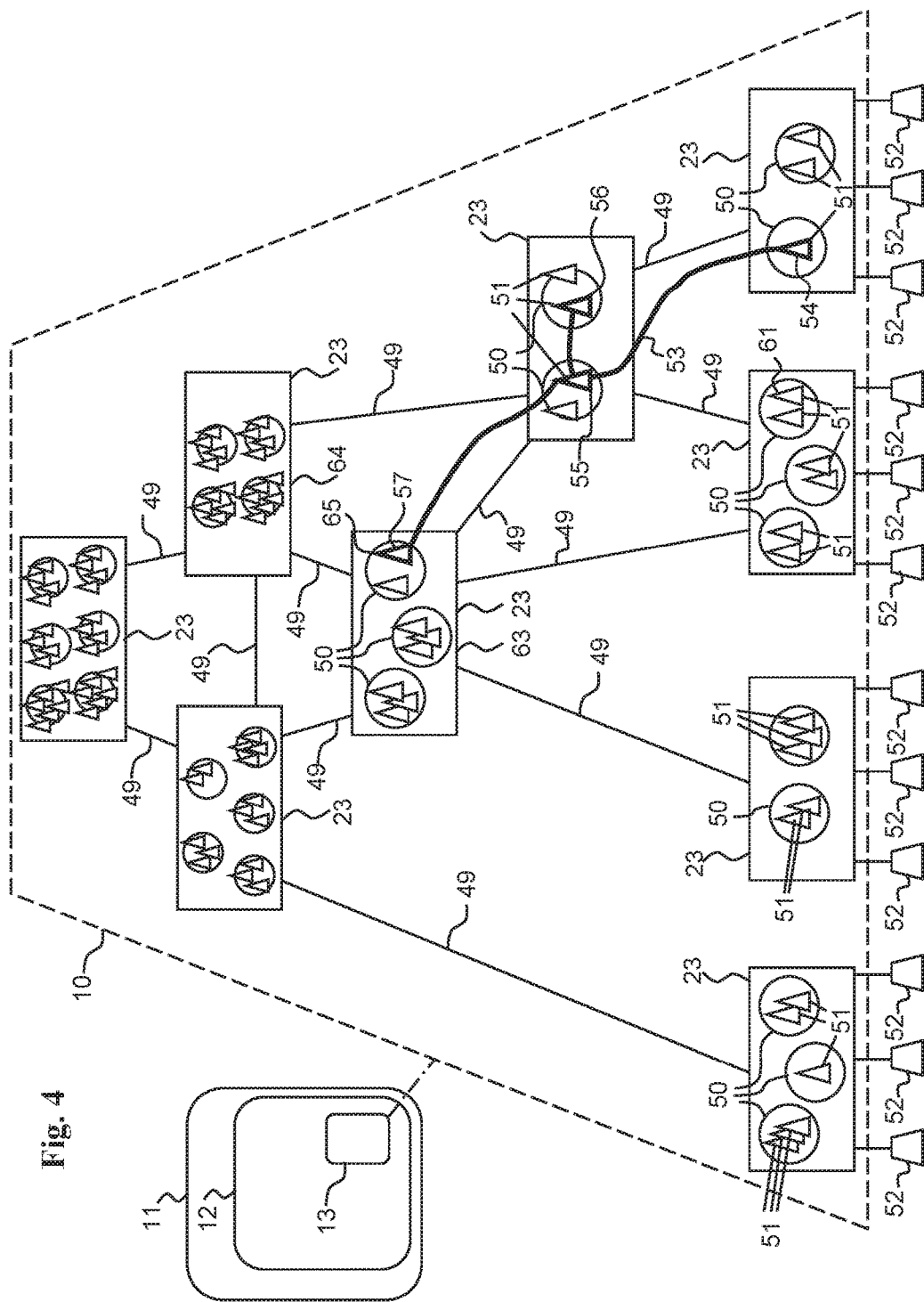
FIG. 4 is a simplified block diagram of a deployment of an NFV-based network, in accordance with one embodiment.

Reference is now made to FIG. 4, which is a simplified block diagram of a deployment of an NFV-based network 10, according to one embodiment of the present invention.

As seen in FIG. 4, NFV-based network 10 includes hardware units 23 connected via transmission lines 49, and VNFs implemented as software programs 50 installed in hardware units 23. Some of hardware units 23 are directly connected to a customer. The customer may be a subscriber, an end-user, or an organization, represented herein as a terminal or a server 52 or a plurality of terminals and/or servers 52. NFV-based network 10 typically includes NFV management system 11, an NFV-orchestration (NFV-O) 12, and defragmentation module 13.

As seen in FIG. 4, several, typically different, VNFs 50 can be installed in the same hardware unit 23. Additionally, the same VNF 50 can be installed in different hardware units 23. A VNF 50 is typically executed by a processor of the hardware unit 23 in the form of a VNF instance 51. Therefore, a particular VNF 50 installed in a particular hardware unit 23 may be "incarnated" in (initiated, executed as) any number of VNF instances 51. Typically, the VNF instances 51 are independent of each other. Typically, each VNF instance 51 serves a different terminal and/or server 52. NFV-based network 10 connects to and between communication terminal devices 52 typically operated by one or more customers, subscribers, and/or end-users.

It is appreciated that a network operator may manage one or more services deployed in the customer's premises. Therefore, some of the hardware units 23 may reside within the premises of the network operator while other hardware units 23 may reside in the customer's premises. Similarly, a server such as server computer 16 of FIG. 1, being a terminal device 52 of FIG. 4, may reside in the premises of the network operator or in the customer's premises. Consequently, when the network operator provides and/or manages one or more services for a customer's terminal devices 52 such as server computer 16, the NFV-based network 10 of the network operator directly manages the VNFs 50 providing the services and their VNF instances 51. In such situation the NFV-based network 10 manages the services irrespectively of the location of the terminal devices 52 (e.g., server computer 16), whether in the premises of the network operator or in the customer's premises. In other words, the NFV-based network 10 may be managing VNFs 50 and VNF instances 51 providing the services, as well as the terminal devices 52 (e.g., server computer 16) being co-located within the same computing device (e.g., hardware unit 23), whether in the premises of the network operator or in the customer's premises.

A service provided by the communication network may be implemented using one or more VNFs. Otherwise put, a service is a group, or a chain of interconnected VNFs. The VNFs making the group, or the service, may be installed and executed by a single processor, by several processors on the same rack, within several racks in the same data-center, or by processors distributed within two or more data-centers. The present invention relates to optimizing the deployment of a service in a communication network using network function virtualization, and to optimizing the deployment of a group, or a chain, of virtual network functions (VNFs) in an NFV-based network. Therefore, the term "chain optimization" refers to the planning and/or managing the deployment of VNFs making a chain, or a group, of VNF providing a particular service.

For example, FIG. 4 shows a first service 53, including VNFs 50 and their respective VNF instances 51 designated by numerals 54, 55, 56, and 57 and a thick line. In this example the group or chain of the VNFs 50 making first service 53 are connected as a chain of VNFs 50. However, the VNFs 50 making a service can be connected in any conceivable form such as star, tree-root, tree-branch, mesh, etc., including combinations thereof. It is noted that a VNFs 50 may be executed by two or more VNF instances 51, such as VNF 54.

The deployment of the group or chain of the VNFs 50 making first service 53 is therefore limited by constraints such as the capacity of the communication link 49 bandwidth and/or latency (delay).

Typically, a VNF 50 has a list of requirements, or specifications, such as processing power, cash memory capacity, regular memory capacity (RAM, dynamic, or volatile memory), non-volatile memory (such as flash memory) capacity, storage capacity, power requirements, cooling requirements, etc. A particular VNF instance 51 providing a particular service (to a particular customer) may have further requirements, or modified requirements, for example associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for roll-back and/or recover, fault-tolerance, fail-safe operation, etc.

Typically, a service made of a chain or a group of VNFs 50 and their VNF instances 51 has a similar list of requirements, or specifications, covering the service as a whole. Therefore, such requirements, or specifications, imply, affect, or include, requirements, or specifications, regarding communication links between VNFs 50 and/or VNF instances 51. Such requirements, or specifications, include bandwidth, latency, bit-error rate, packet loss, etc. Such communication requirements or specifications further impose deployment limitations, or constraints, requiring particular VNFs 50 and/or VNF instances 51 to reside in the same data-center, or within the same rack, or even in the same computing device, for example, sharing memory or executed by the same processor.

Security measures add further requirements, or specifications, such as co-location of some VNFs 50 and/or VNF instances 51.

NFV-based network 10 has a hierarchical structure. There are at least four aspects of the hierarchical structure of NFV-based network 10. The networking or traffic aspect refers to the arrangement of the transmission lines between hardware units 23. The processing aspect refers to the arrangement of the hardware units 23. The software aspect refers to the arrangement of the VNFs 50. The operational aspect refers to the arrangement of the VNF instances 51.

An important aspect of the optimization process in an NFV-based network is that it is based on real-time needs, rather than long-term, statistically anticipated, needs. The only limitation on network reconfiguration in NFV-based network is that it does not result in a deterioration of any of the current services. NFV deployment module 33 enables, and manages, migration of services between hardware units 23, VNFs 50, and VNF instances 51 in real-time, without affecting the availability of a service, and while securing service and session continuity.

The term "continuous" here means that deployment optimization module 33 and and/or chain optimization module 34 perform the relevant optimization task or process in run-time, or real-time, or online, or on-the-fly, or repetitively and without adversely affecting the network's functionality and its services.

Unlike a legacy network, the NFV-based network has two topologies: the topology of the hardware devices, and the topology of the VNFs (the distribution of VNFs among the hardware devices). The topology of the hardware network is relatively stable, while the VNF topology can be optimized in real-time. Another major benefit of the NFV-based network is that modifying the software topology (the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

It is therefore advantageous to localize NFV-O 12, and particularly the deployment optimization processes associated with deployment optimization module 33 and chain optimization module 34 to reduce the cost as discussed above, and simultaneously to secure the possibility to expand the scope of the network managed by these processes, if so needed.

Figure 5:
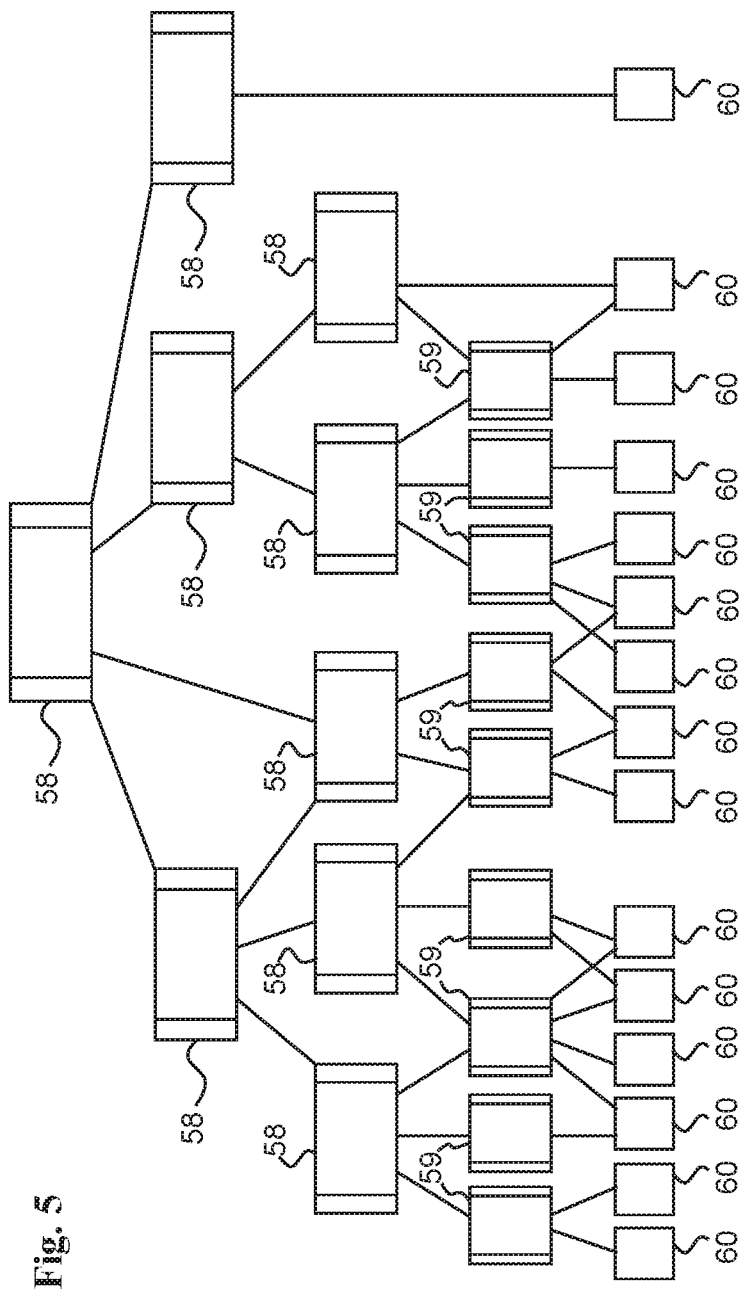
FIG. 5 is a simplified block diagram of a distributed deployment of NFV-O, in accordance with one embodiment.

Reference is now made to FIG. 5, which is a simplified block diagram of a distributed deployment of NFV-O 12 according to one embodiment of the present invention.

The distributed architecture of NFV-O 12 enables faster response to local events on one hand, and improved scalability on the other hand. In a distributed NFV-O 12 architecture, decision processes are performed in self-contained and local decision points, closer to the customer, and closer to the events (such as network or security faults).

The hierarchy of a distributed NFV-O 12 can be viewed as a tree of two component types: core component 58 and leaf component 59. NFV-O core component 58 can be a child of another core component 58, and/or a parent of one or more core components 58 or leaf components 59. A leaf component 59 cannot be a parent of a core component 58 or a leaf component 59.

Orchestration parameters managed by a particular leaf component 59 or core component 58 are reported in real-time to the supervising (parent) core component 58. In addition to the supervision, this continuous updating process enables the supervising component to provide backup, and/or support recovery processes associated with hardware and/or software faults as well as security faults and/or breeches.

To provide redundancy a leaf component 59 may be supervised by two or more core components 58, and child core components 58 may be supervised by two or more parent core components 58. The orchestration parameters managed by a particular core components 58 or leaf component 59 are also mirrored to the backup core components 58. Optionally, NFV-O Core components 58 have the same fully functional orchestration capabilities while leaf components are limited to simple, well defined and localized sub-orchestration tasks, and thus may provide a faster response to demands and changing load.

A cloud management system (CMS) 60 is a software package managing one or more hardware units 23 operating one or more VNFs 50 and executing one or more VNF instances 51. A CMS 60 can be managed by one or more leaf components 59 or core components 58, or combinations thereof. A CMS 60 can be located in the operator's premises or in the customer's premises or partly in both.

An NFV-O component such as a core components 58 or a leaf component 59 typically orchestrates a particular, predefined, territory. The territory may be one or more cloud management systems 60, one or more services, one or more customers, etc. Therefore, there can be an overlap between territories of different NFV-O components. For example, one NFV-O component orchestrates a CMS 60, another NFV-O component orchestrates a service that is at least partly provided the same CMS 60, and additionally a third NFV-O component orchestrates services for a particular customer connected to that same CMS 60.

If, for any reason, the first responder NFV-O component cannot resolve the problem, for example for lack of adequate or sufficient resources within the territory of the particular NFV-O component, the problem is escalated above to the supervising or parent NFV-O component.

The NFV-O is a central component of the network as a system and as such presents a major risk. An attack against the NFV-O may result in a total network outage. Securing the NFV-O is therefore a goal and a challenge. A distributed NFV-O architecture enhances the network resilience/endurance. When an attack on a particular instance of the NFV-O is detected the NFV-O instance is isolated and its functionality is transferred to one or more other NFV-O instances.

Another aspect of NFV-O hierarchy is stratified granularity, or resolution, of the orchestration process. An NFV-based network 10 may include a very large number of hardware elements (processors, memory units, storage units, communication links, etc.) and an even larger number of VNFs 50 and VNF-instances 51. Each of the VNF-instances 51 have a number of requirements (such as processing power, memory size, storage size, communication bandwidth, latency and jitter, etc.). Each of these hardware elements and software modules produce a number of load values (typically corresponding to their respective requirements).

All this creates a large amount of data that should be processed continuously or repeatedly to determine possible adverse conditions (e.g., a particular overload) or a potential cost saving situation. Such situation may require deployment optimization (e.g., the planning of a newly optimized deployment of VNF-instances 51) and redeployment (implementing the optimized deployment). The NFV-O hierarchy enables scalability of the redeployment optimization process by distributing the process in a hierarchical manner.

One optional aspect of hierarchical deployment optimization is that higher levels in the NFV-O hierarchy processes deployment optimization in a coarser granularity (or resolution), while lower levels in the NFV-O hierarchy processes deployment optimization in a finer granularity (or resolution).

For example, while a leaf component 59 manages its part (territory) of the NFV-based network 10 in terms of particular hardware elements (e.g., processors, memory units, storage units, communication links, etc.) and software elements (e.g., VNFs 50 and VNF-instances 51) a core component 58 may manage its part (territory) of the NFV-based network 10 in terms of whole subordinate (child) core components 58 or leaf components 59 it supervises. Thus, such parent core component 58 performs deployment optimization in terms of requirements and load values applied to whole subordinate (child) core components 58 or leaf components 59.

A customer may use the services of several telecom operators. For example, an international company operating in several countries. Such a customer usually establish a virtual private network (VPN) across this plurality of telecom operators. Considering that these operators now operate NFV-based networks, the customer may establish a service including a plurality of VNFs where different VNFs are part of different networks. Managing such inter-operator VNF-chain, or service, requires tight coordination across different NFV-based networks. Such coordination can be implemented using the following methods: enabling tight coordination between NFV-Os of the different NFV-based networks, and/or establishing an inter-network NFV-O module that manages one or more inter-network VNF-chains, or services of a particular customer.

Optionally, and perhaps preferably, such inter-network NFV-O supervises two or more child or leaf NFV-O modules, each within a particular NFV-based network incorporating an NFV participating in the particular VNF-chain or service.

It is appreciated that NFV-Os of different operators may be provided by different NFV-O vendors.

In a first network configuration a single NFV-O module 12 manages the deployment of VNFs 50 and VNF instances 51 throughout the entire NFV-based network 10. Deployment optimization module 33 (and chain optimization module 34) of the NFV-O module 12 continuously investigate the development of loads and provide alternative deployment plans. Consequently, NFV-O module 12 redeploys VNFs 50 and VNF instances 51 and reallocates network resources accordingly.

Deployment optimization is indicated when one part of NFV-based network 10 is over-loaded (or approaches an overload situation) while another part of NFV-based network 10 is relatively idle. The redeployment migrates some of the network entities (e.g., VNFs 50 and VNF instances 51) from the overloaded part of NFV-based network 10 to the relatively idle part of NFV-based network 10 to free resources where needed mostly. Therefore, the deployment optimization and redeployment activities follow the changes of load distribution.

Returning to FIG. 4, in a first scenario, the load on VNF instance 51 designated by numeral 61 increases. For example, the load may be processing load, memory load, storage load, storage latency, storage jitter, etc. To free the loaded resource VNF instance 51 designated by numeral 62 is migrated to hardware unit 23 designated by numeral 63.

In a second scenario, the resource availability in hardware unit 63 is insufficient or the requirements of VNF instance 62. There is sufficient resource availability in hardware unit 23 designated by numeral 64. However, VNF instance 62 cannot be placed in hardware unit 64, for example, because of insufficient communication bandwidth, or excessive communication latency, etc. Therefore, VNF instance 51 designated by numeral 65 is migrated to hardware unit 64 to free the relevant resource for VNF instance 62.

Cloud defragmentation refers to a process of reorganizing fragmented resources in an NFV-based network. The resources become fragmented due to a process of repeated resource redeployment. The process considers the logical NFV resource entity which may take any form or type such as processing power, memory, storage, communication bandwidth, latency, jitter, electric power, cooling power, etc., as well as other forms of consumption. Cloud defragmentation refers to the availability of any particular resource in a particular physical or logical location, and/or the availability of any particular resource in a particular logical processing entity or function such as an NFV or an NFV entity. For example, cloud defragmentation refers to the availability of a particular resource (or group of resources) for a particular logical processing entity in a particular location.

The advantage of the NFV-based network is that the software is hardware-agnostic and therefore every piece of software can be executed by any appropriate piece of hardware. This enables sophisticated deployment of software within the hardware infrastructure. Furthermore, the NFV-based network enables continuous deployment optimization implemented as real-time modification of the software deployment. Software deployment, or software deployment optimization, or software redeployment, is usually implemented by redeployment of VNFs 50 and VNF instances 51.

As disclosed above, software deployment optimization and/or software redeployment are typically managed by NFV-O module 12, and particularly by deployment optimization module 33 and chain optimization module 34. It is appreciated that the process of software (or VNF) deployment optimization (or redeployment) may also be described as a process of optimizing the allocation of network resources to VNF instances 51, or a continuous process of resource reallocation.

The NFV-based network 10 can therefore be divided into a loaded part and available part. The available part of NFV-based network 10 is the part where resources are available for use. Resource availability here refers to the part of the resource (or network) that is not currently used, and is thus available for use (and not to the network resilience regarding faults, etc.).

The process of software (or VNF) deployment optimization (or redeployment) typically involves the migration of VNFs 50 and/or VNF instances 51 from loaded parts of NFV-based network 10 to parts of NFV-based network 10 having resource availability. It is appreciated that wherever the terms VNF or VNF instance are used it may also mean a virtual machine (VM) including one or more VNFs or VNF instances. Alternatively, a VNF or VNF instance may be identified with a Virtual Network Function Component (VNFC), which may include one or more Virtual Data Units (VDU), which may be identified with a VM. It is appreciated that a VNF may also refer to a service, or a group, or a chain of VNFs and/or VNF instances.

One goal of the software deployment optimization, or resource reallocation, is to spread the load evenly throughout the network. This may result in the network availability (the part of the network not used) being evenly spread throughout the network. In such situation each of the network resources may be used approximately to the same level.

In the first scenario described above, it may be possible that a VNF 50 and/or VNF instance 51 cannot be migrated from its current location because there is no other location where all the required resources are available in the required quantities. In other words, the network availability (the availability of the network's resources) is fragmented. In other words, although there is enough availability of the network resources in general, not enough availability is located in a particular location (or segment, or hardware unit 23) of the network to satisfy the requirements of a particular VNF 50 and/or VNF instance 51. The process of defragmentation collects fragmented (or unusable) network (resource) availability into useable pools.

It is therefore appreciated that the defragmentation process may increase the load on a particular network resource to increase the availability of another resource. The defragmentation process may therefore involve a process of migrating one or more VNFs 50 and/or VNF instances 51 to increase the load on some resources, so as to increase the availability of other resources.

Figure 6:
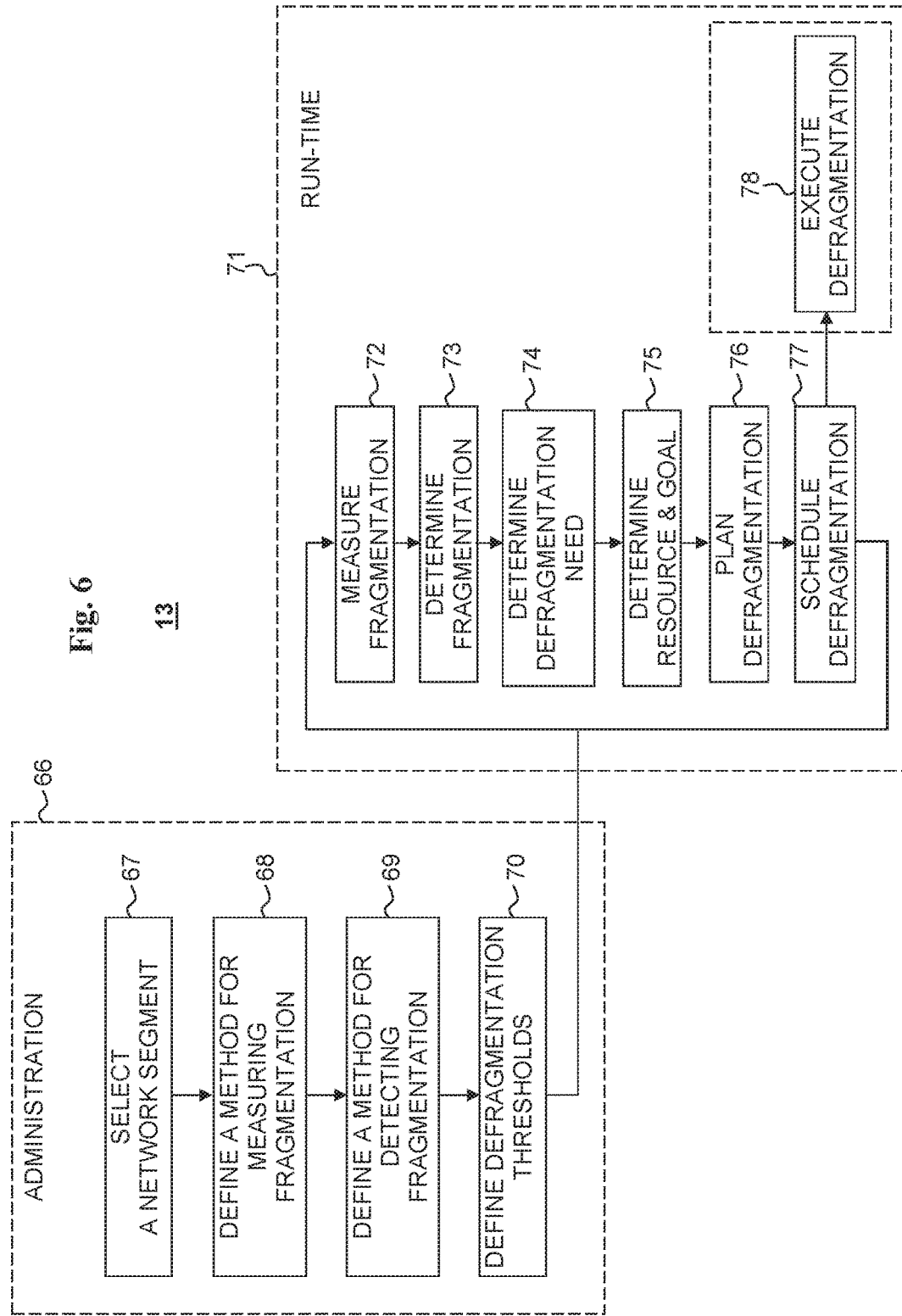
FIG. 6 is a simplified flow-chart of defragmentation module, in accordance with one embodiment.

Reference is now made to FIG. 6, which is a simplified flow-chart of defragmentation module 13, according to one embodiment of the present invention.

As seen in FIG. 6, defragmentation module 13 has two parts: administration part 66, including steps 67, 68, 69, and 70, and run-time part 71, including steps 72, 73, 74, 75, 76, 77, and 78. The administration part is typically operated from time to time by network administrator 22. The run-time part is typically executed continuously or repeatedly and/or automatically. Optionally, the administrative part and the run-time part are executed by separate tasks (e.g., threads, VNF instances).

In step 67 administrator 22 defines or selects a segment of NFV-based network 10 for which the definitions or selections made in steps 68, 69, and 70 may apply. The network segment is a part of the NFV-based network 10, typically a contiguous part, typically including a plurality of hardware units 23. Typically the hardware units 23 are connected by communication link or transmission lines 49 forming a contiguous part of NFV-based network 10. The network segment may also include one or more CMS 60, datacenters, etc.

Alternatively or additionally, a network segment can be identified or selected as a particular plurality of resources of the same type or of different types, and/or a particular plurality of VNFs 50 and/or VNF instances 51.

Alternatively or additionally, a network segment can be identified or selected according to an NFV-O module 12, a core component 58, or a leaf component 59. Such entity can be defined or selected according to the entities it manages, such as resources, hardware units 23, VNFs 50, VNF instances 51, etc.

The administrative part (steps 68, 69, and 70) apply to the entire NFV-based network 10, or may be limited to a particular part of the NFV-based network 10, for example to a particular core component. The administrator of a particular core component is therefore limited to the particular part of the NFV-based network 10, or a particular core component, when selecting a network segment or particular selection of network entities such resources, hardware units 23, VNFs 50, VNF instances 51, etc.

It is appreciated that the order of performing steps 67, 68, 69, and 70 may be arbitrary.

The run-time part (steps 72, 73, 74, 75, 76, 77 and 78) is typically executed for the same scope of entities defined in the administrative part. However, optionally, for example, the administrative part may be defined for a parent (core) component 58 or (the entire network) and the run-time part may be executed independently for each leaf component 59, or any other part of the network.

In step 68 administrator 22 defines or selects a method for measuring fragmentation. In step 69 administrator 22 defines or selects a method for detecting or determining a state of fragmentation. In step 70 administrator 22 defines or selects one or more thresholds according to which the method for detecting fragmentation determines that a need for defragmentation exists.

A method for measuring fragmentation as defined or selected in steps 68 may involve optimization related values and availability related values. Administrator 22 may define or select any number of fragmentation measuring methods.

A measure of fragmentation related to optimization includes, for example, the frequency of VNF relocation (redeployment) failures. A VNF relocation failure occurs when deployment optimization module 33, or chain optimization module 34, fails to find an alternative location for a particular VNF instance (to resolve a load condition).

Another measure of fragmentation related to optimization includes, for example, the distance of VNF relocation (redeployment). The distance is measured when deployment optimization module 33, or chain optimization module 34, finds an alternative location for a particular VNF instance (to resolve a load condition).

Another measure of fragmentation related to optimization includes, for example, the number of VNF instances that should be relocated (redeployed) to resolve a load condition.

Typically, optimization related values are measured when the overall availability suggests that optimization is possible. That is to say, the NFV-O module 12 (or core component 58 or a leaf component 59) has sufficient availability of the required resources and yet the redeployment fails, involves many VNF migrations, or involves a distant migration.

A measure of fragmentation related to availability includes, for example, the average size of resource availability and/or the deviation of resource availability. A small average size of resource availability may mean, for example, that the availability of a particular type of resource is spread among many units. Low deviation of resource availability may mean, for example, that no unit may provide sufficient availability.

It is appreciated that the measures described above apply also to other types of events requiring migration of one or more VNFs and/or VNF instances, such as events related to preventive maintenance, fault recovery, security protection and recovery, etc.

A method for determining or detecting fragmentation, or a need for defragmentation, as defined or selected in step 69 may involve any combination of measurement values and calculations thereof. A method for determining or detecting the state of fragmentation typically involves a rule, or a formula, or an algorithm, and comparing the result with one or more thresholds defined in step 70. Administrator 22 may define or select any number of fragmentation detection methods.

It is appreciated that methods for measuring fragmentation (as may be applicable to step 68), methods for detecting or determining a state of fragmentation (as may be applicable to step 69), as well as determining a fragmentation threshold (as may be applicable to step 70) may be provided manually or automatically, for example, using machine learning technologies or using methods of big-data analytics. Analyzing the history and/or accumulated data provided by repeated deployment optimization processes as well as the history and/or accumulated data provided by repeated defragmentation processes may lead to additional methods or algorithms for measuring fragmentation, additional methods or algorithms, for detecting or determining a state of fragmentation, and additional methods or algorithms for determining fragmentation thresholds.

As seen in FIG. 6, the run-time part 71 of defragmentation module 13 starts with step 72 by performing one or more methods of measuring fragmentation as described above and defined by administrator 22. Defragmentation module 13 proceeds to step 73 to determine the state of fragmentation and the need to perform defragmentation (step 74).

The need for defragmentation may be determined according to a prediction of the development of loads and demand for resources scarce in the area of the network where a state of fragmentation is determined. Determining a need for defragmentation is typically followed, including selecting a target resource and a goal (step 75).

The target resource is a network resource [e.g., processing power, cash memory capacity, regular memory capacity (RAM, dynamic, or volatile memory), non-volatile memory (such as flash memory) capacity, storage capacity, power, cooling, bandwidth, etc.] which is in scarce, and/or expected to be in scarce, and/or for which load is expected to increase, etc. Step 75 typically selects such resource and sets a goal for the defragmentation process. The goal is set in terms of a value or magnitude of a pool of resource availability that the defragmentation process should achieve.

The resource pool, or the pool of resource availability, may provide a consumer such as a VNF instance, with resource availability of the specified goal. The resource pool may therefore be contiguous in the sense that the consumer may view the resource pool as a single unit of the resource, or a virtual unit, or a virtual unified resource unit. For example, a storage pool may be provided in two or more disks appearing to a processing unit as a single, or unified, virtual disk. For example, a bandwidth pool may be provided via two or more communication or transmission links appearing to a processing unit as a single, or unified, virtual link.

If a need for defragmentation is determined, a resource is selected and a goal is set (in steps 73, 74 and 75), defragmentation module 13 proceeds to step 76 to prepare a defragmentation plan, and then to schedule the defragmentation for execution (step 77). Defragmentation module 13 then proceeds to step 78 to execute defragmentation according to the plan and schedule.

It is appreciated that steps 77 and 78 may be performed iteratively or separately. Iterative processing here means that steps 77 and 78 are performed repetitively to incrementally arrive at the desired availability (the goal as set in step 75). Separate processing here means that step 77 is completed before step 78 starts (for example to enable scheduling of step 78). It is appreciated that step 78 may be executed by a different task (e.g., a different thread, a different VNF instance, etc.).

It is appreciated that measuring fragmentation (as may be applicable to step 72), detecting or determining a state of fragmentation (as may be applicable to step 73), as well as applying a particular fragmentation threshold and determining a defragmentation need (as may be applicable to step 74) may be provided, for example, using a machine learning technology and/or a method of big-data analytics. Analyzing the history and/or accumulated data provided by recent deployment optimization processes as well as the history and/or accumulated data provided by previous defragmentation processes may determine a fragmentation value, fragmentation status and/or defragmentation need.

Figure 7:
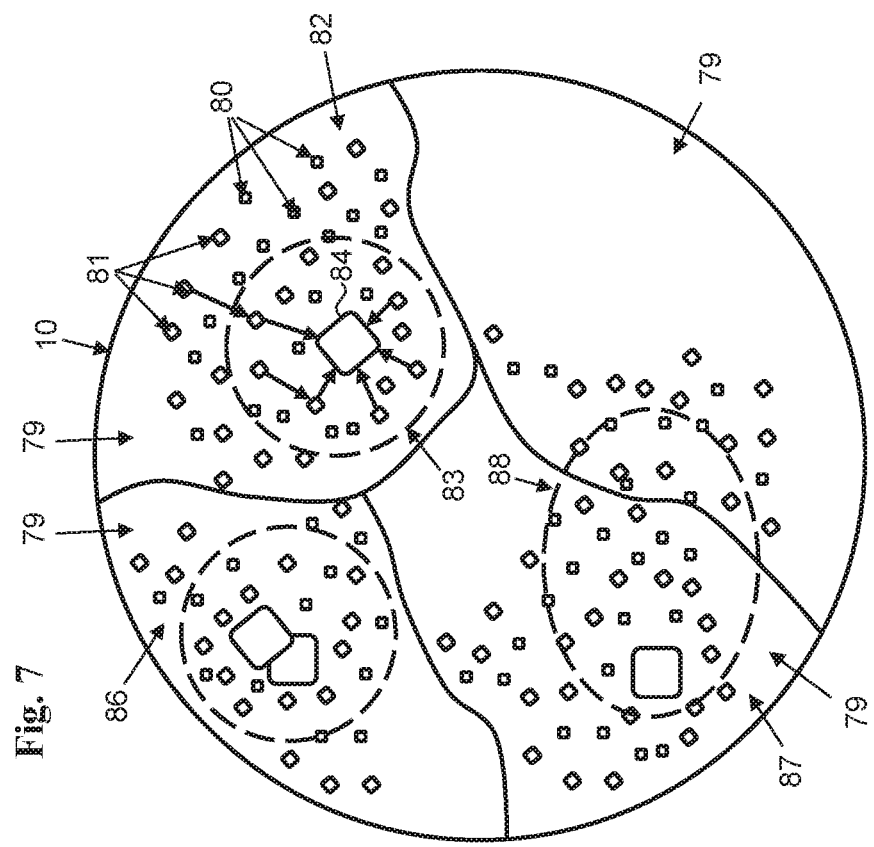
FIG. 7 is a simplified illustration of a state of fragmentation, in accordance with one embodiment.

Reference is now made to FIG. 7, which is a simplified illustration of a state of fragmentation, according to one embodiment of the present invention.

FIG. 7 shows an NFV-based network 10 in a state of fragmentation. The NFV-based network 10 of FIG. 7 is divided into four zones 79, each zone 79 being managed by an NFV-O module 12 (not shown). In this example the NFV-O modules 12 are leaf components 59. The supervising structure of core components is not shown. FIG. 7 shows two types of resources. A first type of resource 80 is designated by a square, and a second type of resource 81 is designated by a rhombus. The plurality of small squares or rhombuses designate a location of availability of a resource of the respective type. It is appreciated that resources 80 and 81 are typically mounted within respective hardware units 23 (not shown in FIG. 7).

As shown in FIG. 7, in zone 79 designated by numeral 82, defragmentation module 13, typically executing the runtime part, has measured fragmentation in zone 79, and has determined a state of fragmentation in at least an area of zone 79 designated by numeral 83. The state of fragmentation is determined for at least one resource, such as resource 81 designated by a rhombus.

Defragmentation module 13 has also identified that demand for resource 81 is anticipated to grow. Defragmentation module 13 has further determined to provide the expected demand for resource 81 in a pool location designated by numeral 84. Defragmentation module 13 has additionally determined a minimum level of availability of resource 81 that resource pool 84 should contain.

Thereafter, defragmentation module 13 identifies fragmented instances of resource 81 within zone 79, typically within area 85, and migrates these fragmented instances of resource 81 into resource pool 84, typically until the minimum level of availability is reached.

As shown in FIG. 7, in zone 79 designated by numeral 86, defragmentation module 13 may execute the run-time part for two or more resources, establishing two or more resource pools.

As shown in FIG. 7, in zone 79 designated by numeral 87, defragmentation module 13 may execute the run-time part for an area 88 spanning two or more zones 79.

Figure 8:
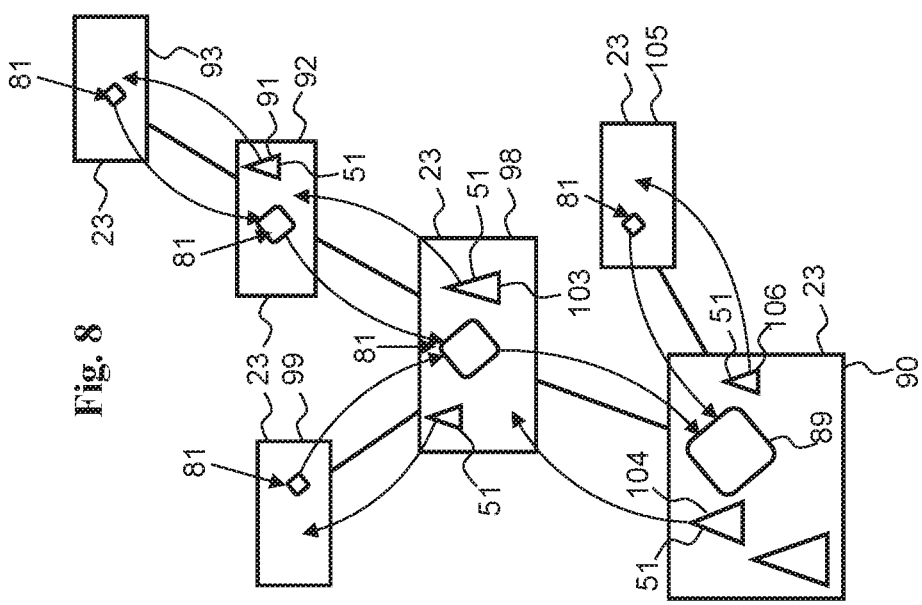
FIG. 8 is a simplified illustration of a process of defragmentation, in accordance with one embodiment.

Reference is now made to FIG. 8, which is a simplified illustration of a process of defragmentation, according to one embodiment of the present invention.

FIG. 8 shows several hardware units 23, each including an instance of a particular resource designated as resource 81. The size of the rhombus designating resource 81 designates the amount of availability of the particular resource instance. As described above with reference to FIGS. 6 and 7, defragmentation module 13 has determined a state of fragmentation for resource 81 and a resource pool 89 located in hardware unit 23 designated by numeral 90.

As seen in FIG. 8, defragmentation module 13 is migrating availability of resources 81 into resource pool 89. In the example of FIG. 8, defragmentation module 13 is migrating availability by migrating VNF instances 51 in the opposite direction. That is, resource availability is migrated from a first hardware unit into the resource pool in a second hardware unit by migrating associated VNF instances from the second hardware unit into the first hardware unit.

It is appreciated that defragmentation module 13 may migrate the entire VNF instance 51, or just the demand of the particular VNF instance 51 for the particular resource 81, or just a part of the demand of the particular VNF instance 51 for the particular resource 81.

As seen in FIG. 8, defragmentation module 13 migrates VNF instance 51 designated by numeral 91 from hardware unit 23 designated by numeral 92 into hardware unit 23 designated by numeral 93, where the availability of resource 81 is sufficient for VNF instance 91. Thus, availability of resource 81 is migrated from hardware unit 93 to hardware unit 92, increasing the availability of resource 81 in hardware unit 92.

Defragmentation module 13 repeats this operation advancing in the direction of resource pool 89, collecting availability of resource 81 from the other hardware units 23 shown in FIG. 8.

Reference is now made to FIG. 9, which is a simplified flow chart of a defragmentation planning process 94, according to one embodiment of the present invention.

Defragmentation planning process 94 is an example of an embodiment of step 76 of defragmentation module 13 shown and described with reference to FIG. 6.

As seen in FIG. 9, defragmentation planning process 94 starts with step 95 by determining a network segment where availability pool is located, such as element 84 of FIG. 7, or element 89 of FIG. 8. The network segment where availability pool is located is typically a hardware unit 23.

It is appreciated that the location of a resource pool may be determined based on several considerations. A first consideration may be to locate the resource pool in a hardware unit, or in the vicinity of a hardware unit, where the demand for the particular resource of that pool is expected to grow in the near future. The term "vicinity" may refer to physical proximity such as physical distance or network distance measure in terms of transmission bandwidth, latency, jitter, etc.

A second consideration may be to locate the resource pool in the vicinity of one or more VNF instances where the demand for the particular resource of that pool is expected to grow in the near future.

A third consideration may be to locate the resource pool within the territory of an NFV-O module, such as leaf component 59 or a core component 58 of FIG. 5, where the demand for the particular resource of that pool is expected to grow in the near future.

A fourth consideration may be to locate the resource pool in a hardware unit, or in the vicinity of a hardware unit, or in the vicinity of one or more VNF instances, or within the territory of an NFV-O module (as described above) where the demand for the particular resource of that pool is expected to decrease in the near future so that a hardware unit (e.g. a DC, or a CMS 60 of FIG. 5) may be shut down to save operational costs.

It is appreciated that in this respect the consideration for locating a resource pool is that, for example, the hardware unit where the resource pool is located can be turned off, or that the cooling infrastructure to that particular hardware unit can be turned off, etc.

Defragmentation planning process 94 then proceeds to step 96 to select target resources from which to collect (or migrate) availability towards the selected pool. The target resources are typically hardware units 23 having desired availability (such as the type of resource selected in step 75 of FIG. 6).

Defragmentation planning process 94 then proceeds to step 97 to select VNF instances 51 to be migrated to the target resource selected in step 96. These VNF instances 51 are typically operating in hardware units 23 communicatively coupled to the target resources.

It is appreciated that hardware units 23 may be communicatively coupled directly, that is connected by a communication link or a transmission line 49, such as hardware units 92 and such as hardware unit 23 designated by numeral 98. Alternatively, hardware units 23 may be communicatively coupled indirectly. For example via a third hardware unit 23, such as hardware units 92 and 99 connecting via hardware unit 98. In this example a VNF instance may be migrated from hardware unit 92 to hardware unit 99 and then a VNF instance may be migrated from hardware unit 98 to hardware unit 92.

VNF instances are selected until (step 100) the sum of the availability they provide upon migration reaches the availability goal for the pool as set in step 75 (FIG. 6). Target resources may be added (step 101) as necessary to reach to goal.

When the goal is reached, defragmentation planning process 94 typically proceeds to step 102 to order the migration steps of the VNF instances selected in step 97.

There may be several methods and/or algorithms for performing steps 96 and 97. Examples of some of such methods and/or algorithms are disclosed below. It is appreciated that various combinations of the methods and/or algorithms disclosed below are possible and contemplated herein.

In one embodiment of a method or algorithm for the defragmentation process the method or algorithm may include the following steps.

As in step 75 of FIG. 6, the method may include selecting a resource type such as resource 81 and optionally determining a defragmentation goal. The defragmentation goal is typically a value of fragmentation of the selected resource, or a value of availability of the selected resource.

The method may also include selecting a first section of the NFV-based network 10, such as hardware unit 90, where demand for the resource type is expected to grow.

The method may also include selecting a second section of the NFV-based network 10, such as hardware unit 92, where demand for the resource type is expected to be stable relative to the first section.

The method may also include selecting a third section of the NFV-based network 10, such as hardware unit 98, which is communicatively coupled to the first and the second sections. The third section typically comprises higher availability of the resource type than the first section.

The method may also include migrating a VNF instance 51, such as VNF instance designated by numeral 103, from the third section to the second section thus migrating availability of resource 81 from the second section to the third section, which enables migration of one or more VNF instances from the first section to the third section.

The method may also include migrating a VNF instance 51, such as VNF instance designated by numeral 104, from the first section to the third section.

It is appreciated in the method or algorithm described above, as well as in some of the methods or algorithms described below, the steps of selecting a resource type may be performed as a part of step 75 of FIG. 6, the steps of selecting sections of the network may be performed as a part of step 76 (planning defragmentation) of FIG. 6, and that the steps of migrating VNF instances 51 may be performed as a part of step 78 (executing defragmentation) of FIG. 6.

It is appreciated that alternatively, and/or additionally, the defragmentation process described herein may include the following steps.

The process may include selecting a resource type such as resource 81 (as in step 75 of FIG. 6, as disclosed above).

The process may also include selecting a first section of the NFV-based network 10 where demand for the resource type is expected to grow, for example, hardware unit 90.

The process may also include selecting a second and a third section of the NFV-based network 10 where demand for the resource type is expected to be stable relative to the first section (for example, hardware units 98 and 105).

The process may also include migrating VNF instances 51, such as VNF instances designated by numerals 104 and 106, from the first section to the second and third sections thus joining (defragmenting) resource availability from the second and third sections into a unified resource pool in the first section.

It is appreciated that alternatively, and/or additionally, the defragmentation process described herein may include the following steps: selecting a resource type, such as resource 81 (as in step 75 of FIG. 6, as disclosed above); selecting a first section of the NFV-based network 10 where demand for the resource type is expected to grow, for example, hardware unit 90; selecting a second section of the NFV-based network 10 communicatively coupled to the first section, for example, hardware unit 98; selecting a third and a fourth section of the NFV-based network 10, the third and a fourth sections being communicatively coupled to the second section, for example, hardware units 92 and 99; migrating VNF instances 51 from the second section (98) to the third and fourth sections (92 and) thus migrating availability from third and fourth sections (92 and 99) to second section (98) [thus increasing defragmented availability in second section (98)]; and migrating a VNF instance 51 from the first section (90) to the second section. (98) thus migrating availability from second section (98) to first section (90) [thus increasing defragmented availability in first section (90)].

It is appreciated that alternatively, and/or additionally, the defragmentation process described herein may include the following steps:

a) selecting a resource type, such as resource 81 (as in step 75 of FIG. 6, as disclosed above);

b) selecting a hardware unit 23 of low availability of the selected resource type;

c) selecting a hardware unit 23 having availability of the selected resource that is higher than the availability of that selected resource in the hardware unit of low availability of the selected resource type;

d) migrating a VNF instance 51 from the selected hardware unit of relatively higher availability to the selected hardware unit of low availability of the selected resource type and e) repeating steps b, c and d until a predefined value of availability is reached for at least one hardware unit.

It is appreciated that alternatively, and/or additionally, the defragmentation process described herein may include the following steps:

a) selecting a resource type (as in step 75 of FIG. 6, as disclosed above);

b) measuring availability of the resource type in a plurality of hardware units (as in step 72 of FIG. 6, as disclosed above);

c) migrating at least one VNF instance from a hardware unit of relatively higher availability to a hardware unit of relatively lower availability, and d) repeating steps b and c until a minimum predefined variance of availability values for the plurality of hardware units is reached.

It is appreciated that alternatively, and/or additionally, the defragmentation process described herein may include the following steps: measuring defragmentation; determining a need for defragmentation; scheduling defragmentation of a part of the NFV-based network to a period when this part of the network is in low load condition; and executing defragmentation within the scheduled period.

Reference is now made to FIG. 10, which is a simplified flow chart of a defragmentation executing module 107, according to one embodiment of the present invention. Defragmentation executing module 107 is an example of an embodiment of step 78 of FIG. 6.

As seen in FIG. 10, defragmentation executing module 107 typically starts with step 108 by loading a defragmentation plan, typically prepared by step 76 of FIG. 6. The defragmentation plan typically includes a list of VNF instances for migration and their order of migration. The defragmentation plan also specify, for each VNF instance, its current location and its target location (to where the VNF instance should be migrated).

Defragmentation executing module 107 then proceeds to step 109 to pick a VNF from the top of the list of VNF instances. In step 110 defragmentation executing module 107 determines the type of the VNF instance (namely which VNF 50). In step 111 defragmentation executing module 107 checks whether required VNF 50 is already installed in the target location. If the VNF 50 is not installed, defragmentation executing module 107 installs the required VNF 50 in step 112.

Defragmentation executing module 107 then proceeds to step 113 to check if the new VNF instance in the target location requires particular data to be operative. If data is required, it is provided in step 114, typically by transferring the appropriate data from the old VNF instance in the current location.

Defragmentation executing module 107 then proceeds to step 115 to initiate the new VNF instance in the target location and to divert communication from the VNF instances communicating with the old VNF instance to the new VNF instance (step 116). Defragmentation executing module 107 then proceeds to step 117 to deactivate the old VNF instance and surrender its resources (step 118). Steps 109, 110, 111, 112, 113, 114, 115, 116, 117 and 118 are then repeated until step 119 determines that all the VNF instances in the list are processed, or until the availability goal set in step 75 of FIG. 6 is reached.

It is appreciated that certain features of the invention, which are, described in the context of different embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

Figure 11:
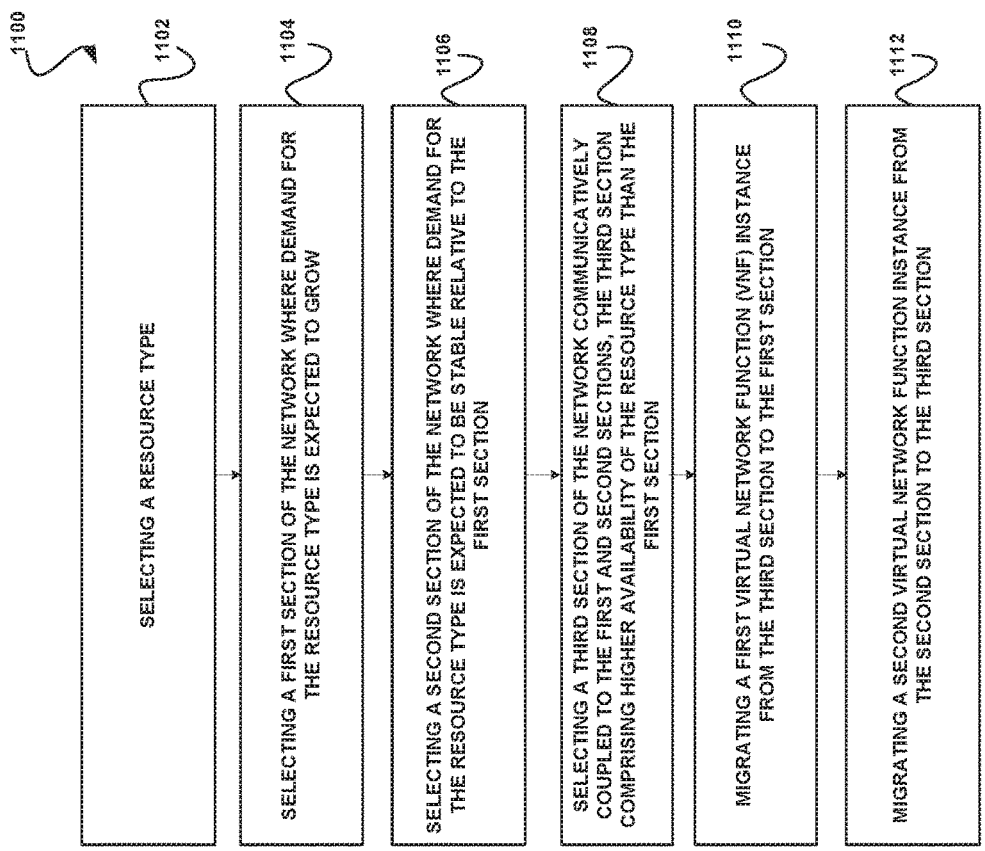
FIG. 11 illustrates a method for migrating availability of a resource type in a communication network using network function virtualization, in accordance with one possible embodiment.

FIG. 11 shows a method 1100 for migrating availability of a resource type in a communication network using network function virtualization, in accordance with one embodiment. As an option, the method 1100) may be implemented in the context of the details of the previous figures and/or any subsequent figure(s). Of course, however, the method 1100 may be implemented in the context of any desired environment. Further, the aforementioned definitions may equally apply to the description below.

As shown, the method 1100 includes selecting a resource type (see operation 1102); selecting a first section of the network where demand for the resource type is expected to grow (see operation 1104); selecting a second section of the network where demand for the resource type is expected to be stable relative to the first section (see operation 1106); selecting a third section of the network communicatively coupled to the first and second sections, the third section comprising higher availability of the resource type than the first section (see operation 1108); migrating a first virtual network function (VNF) instance from the third section to the first section (see operation 1110); and migrating a second virtual network function instance from the second section to the third section (see operation 1112).

In one embodiment, migrating the availability of the resource type in the communication network using network function virtualization may be in response to a prediction of a development of loads associated with the communication network. In another embodiment, migrating the availability of the resource type in the communication network using network function virtualization may be in response to a demand for resources in a scarce area of the communication network where a state of fragmentation is identified.

In another embodiment, migrating the availability of the resource type in the communication network using network function virtualization may be implemented for defragmenting the communication network. In this case, the method 1100 may include defragmenting the communication network using network function virtualization by: measuring defragmentation; determining a need for the defragmentation; scheduling the defragmentation of a part of the communication network to a low-load period of the part of the communication network; and executing the defragmentation.

In another embodiment, migrating the availability of the resource type in the communication network using network function virtualization may be implemented for defragmenting availability of the resource type in the communication network. In this case, the method 1100 may include defragmenting availability of the resource type in the communication network using network function virtualization by: selecting the resource type; and repeatedly selecting a hardware unit of low availability of the resource type and migrating a virtual network function instance from a hardware unit of relatively higher availability to the hardware unit of low availability until a predefined value of availability is reached for at least one hardware unit.

Figure 12:
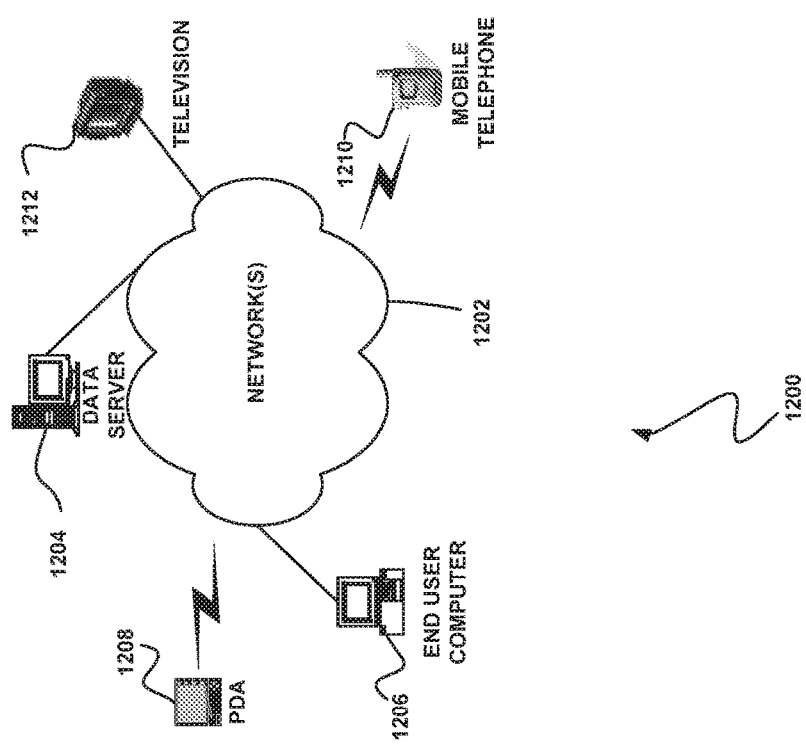
FIG. 12 illustrates a network architecture, in accordance with one possible embodiment.

FIG. 12 illustrates a network architecture 1200, in accordance with one possible embodiment. As shown, at least one network 1202 is provided. In the context of the present network architecture 1200, the network 1202 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1202 may be provided.

Coupled to the network 1202 is a plurality of devices. For example, a server computer 1204 and an end user computer 1206 may be coupled to the network 1202 for communication purposes. Such end user computer 1206 may include a desktop computer, lap-top computer, and/or any other type of logic. Still yet, various other devices may be coupled to the network 1202 including a personal digital assistant (PDA) device 1208, a mobile phone device 1210, a television 1212, etc.

Figure 13:
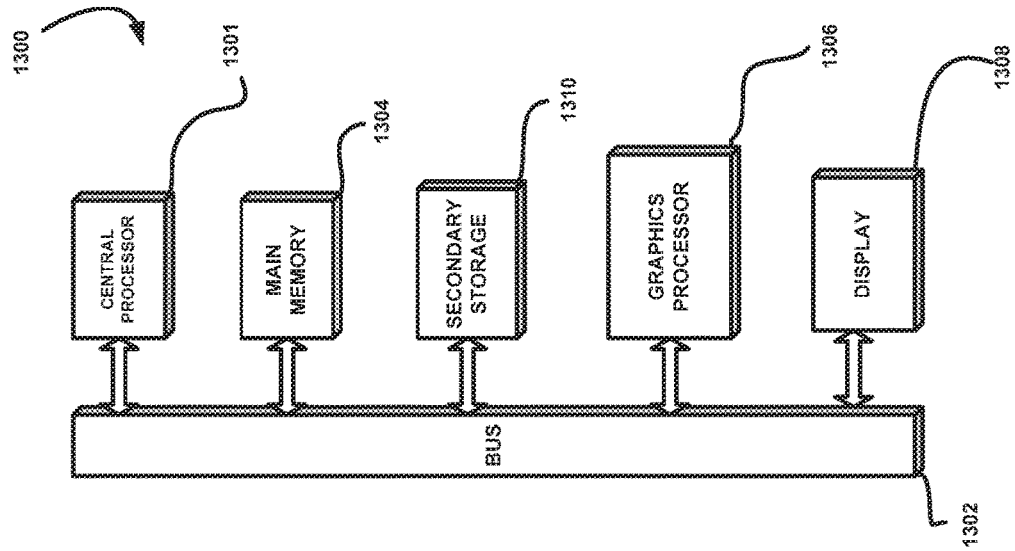
FIG. 13 illustrates an exemplary system, in accordance with one embodiment.

FIG. 13 illustrates an exemplary system 1300, in accordance with one embodiment. As an option, the system 1300 may be implemented in the context of any of the devices of the network architecture 1200 of FIG. 12. Of course, the system 1300 may be implemented in any desired environment.

As shown, a system 1300 is provided including at least one central processor 1301 which is connected to a communication bus 1302. The system 1300 also includes main memory 1304 [e.g. random access memory (RAM), etc.]. The system 1300 also includes a graphics processor 1306 and a display 1308.

The system 1300 may also include a secondary storage 1310. The secondary storage 1310 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1304, the secondary storage 1310, and/or any other memory, for that matter. Such computer programs, when executed, enable the system 1300 to perform various functions (as set forth above, for example). Memory 1304, storage 1310 and/or any other storage are possible examples of non-transitory computer-readable media.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system, comprising:
    one or more hardware processors for:
    determining a state of fragmentation for a type of resource in a network function virtualization (NFV)-based communication network;
    responsive to determining the state of fragmentation, migrating availability of the type of resource in the NFV-based communication network using network function virtualization (NFV), by:
    selecting the resource type;
    selecting a first section of the NFV-based communication network where demand for the type of resource is expected to grow;
    selecting a second section of the NFV-based communication network where demand for the type of resource is expected to be stable relative to the first section;
    selecting a third section of the NFV-based communication network communicatively coupled to the first and second sections, the third section comprising higher availability of the type of resource than the first section;
    migrating a first VNF instance from the third section to the second section to increase availability of the type of resource in the third section; and
    after the migrating of the first VNF instance which increases availability of the type of resource in the third section, migrating a second VNF instance from the first section to the third section having the increased availability of the type resource, thereby increasing availability of the type of resource in the first section of the NFV-based communication network where demand for the type resource is expected to grow.

2. The system of claim 1, wherein migrating the availability of the type of resource in the NFV-based communication network using NFV is in response to a prediction of a development of loads associated with the NFV-based communication network.

3. The system of claim 1, wherein migrating the availability of the type of resource in the NFV-based communication network using NFV is implemented for defragmenting the NFV-based communication network.

4. The system of claim 3, wherein the one or more hardware processors are further operable for defragmenting the NFV-based communication network using NFV by:
    measuring the fragmentation;
    determining a need for the defragmentation;
    scheduling the defragmentation of a part of the NFV-based communication network to a low-load period of the part of the NFV-based communication network; and
    executing the defragmentation.

5. The system of claim 1, migrating the availability of the type of resource in the NFV-based communication network using NFV is implemented for defragmenting availability of the type of resource in the NFV-based communication network.

6. The system of claim 5, wherein the one or more hardware processors are further operable for defragmenting availability of the type of resource in the NFV-based communication network using NFV until a predefined value of availability is reached for at least one hardware unit.

7. A computer program product embodied on a non-transitory computer readable medium, comprising computer code for:
    determining a state of fragmentation for a type of resource in a network function virtualization (NFV)-based communication network;
    responsive to determining the state of fragmentation, migrating availability of the type of resource in the NFV-based communication network using network function virtualization (NFV), by:
    selecting the resource type;
    selecting a first section of the NFV-based communication network where demand for the type of resource is expected to grow;
    selecting a second section of the NFV-based communication network where demand for the type of resource is expected to be stable relative to the first section;
    selecting a third section of the NFV-based communication network communicatively coupled to the first and second sections, the third section comprising higher availability of the type of resource than the first section;
    migrating a first VNF instance from the third section to the second section to increase availability of the type of resource in the third section; and
    after the migrating of the first VNF instance which increases availability of the type of resource in the third section, migrating a second VNF instance from the first section to the third section having the increased availability of the type resource, thereby increasing availability of the type of resource in the first section of the NFV-based communication network where demand for the type resource is expected to grow.

8. The computer program product of claim 7, wherein migrating the availability of the type of resource in the NFV-based communication network using NFV is in response to a prediction of a development of loads associated with the NFV-based communication network.

9. The computer program product of claim 7, wherein migrating the availability of the type of resource in the NFV-based communication network using NFV is implemented for defragmenting the NFV-based communication network.

10. The computer program product of claim 9, further comprising computer code for defragmenting the NFV-based communication network using NFV by:
    measuring the fragmentation;
    determining a need for the defragmentation;
    scheduling the defragmentation of a part of the NFV-based communication network to a low-load period of the part of the NFV-based communication network; and
    executing the defragmentation.

11. The computer program product of claim 7, wherein migrating the availability of the type of resource in the NFV-based communication network using NFV is implemented for defragmenting availability of the type of resource in the NFV-based communication network.

12. The computer program product of claim 11, further comprising computer code for defragmenting availability of the type of resource in the NFV-based communication network using NFV until a predefined value of availability is reached for at least one hardware unit.

13. A method, comprising:
  determining a state of fragmentation for a type of resource in a network function virtualization (NFV)-based communication network;
  responsive to determining the state of fragmentation, migrating availability of the type of resource in the NFV-based communication network using network function virtualization (NFV), by:
  selecting the resource type;
  selecting a first section of the NFV-based communication network where demand for the type of resource is expected to grow;
  selecting a second section of the NFV-based communication network where demand for the type of resource is expected to be stable relative to the first section;
  selecting a third section of the NFV-based communication network communicatively coupled to the first and second sections, the third section comprising higher availability of the type of resource than the first section;
  migrating a first VNF instance from the third section to the second section to increase availability of the type of resource in the third section; and
  after the migrating of the first VNF instance which increases availability of the type of resource in the third section, migrating a second VNF instance from the first section to the third section having the increased availability of the type resource, thereby increasing availability of the type of resource in the first section of the NFV-based communication network where demand for the type resource is expected to grow.

14. The method of claim 13, wherein migrating the availability of the type of resource in the NFV-based communication network using NFV is in response to a prediction of a development of loads associated with the NFV-based communication network.

15. The method of claim 13, wherein migrating the availability of the type of resource in the NFV-based communication network using NFV is implemented for defragmenting the NFV-based communication network.

16. The method of claim 15, further comprising defragmenting the NFV-based communication network using NFV by:
  measuring the fragmentation;
  determining a need for the defragmentation;
  scheduling the defragmentation of a part of the NFV-based communication network to a low-load period of the part of the NFV-based communication network; and
  executing the defragmentation.

17. The method of claim 16, wherein migrating the availability of the type of resource in the NFV-based communication network using NFV is implemented for defragmenting availability of the type of resource in the NFV-based communication network.

* * * * *